US009366860B1

(12) United States Patent
Benner, Jr.

(10) Patent No.: US 9,366,860 B1
(45) Date of Patent: Jun. 14, 2016

(54) MIRROR SCANNING CONTROL SYSTEM AND METHOD

(71) Applicant: William R. Benner, Jr., Longwood, FL (US)

(72) Inventor: William R. Benner, Jr., Longwood, FL (US)

( * ) Notice: Subject to any disclaimer, the term of this patent is extended or adjusted under 35 U.S.C. 154(b) by 228 days.

(21) Appl. No.: 14/172,064

(22) Filed: Feb. 4, 2014

Related U.S. Application Data (60) Provisional application No. 61/760,430, filed on Feb. 4, 2013.

(51) Int. Cl.
  *G02B 26/08* (2006.01)
  *G02B 26/10* (2006.01)

(52) U.S. Cl.
  CPC ............ *G02B 26/105* (2013.01); *G02B 26/101* (2013.01)

(58) Field of Classification Search
  CPC .. G02B 26/08; G02B 26/0816; G02B 26/105; G02B 5/08
  USPC ...................... 359/198.1–203.1, 212.1–215.1, 359/221.1–221.3, 223.1, 225.1–226.2
  See application file for complete search history.

(56) References Cited

U.S. PATENT DOCUMENTS

| 4,958,894 | A * | 9/1990 | Khowles ................. G02B 26/08 318/129 |
| 5,237,165 | A | 8/1993 | Tingley, III |
| 6,243,188 | B1 | 6/2001 | Stukalin et al. |
| 7,212,325 | B2 * | 5/2007 | Pruyn .................. G02B 26/105 359/198.1 |
| D642,265 | S | 7/2011 | Hastings |
| 8,284,470 | B2 | 10/2012 | Brown et al. |
| 8,531,759 | B2 * | 9/2013 | Hombeck ............. B81B 3/0081 359/224.1 |
| 2013/0200158 | A1 * | 8/2013 | Feng .................. G06K 7/10633 235/462.36 |

* cited by examiner

*Primary Examiner* — James Phan
(74) *Attorney, Agent, or Firm* — Carl M. Napoitano; GrayRobinson, P.A.

(57) ABSTRACT

A galvanometer-based optical scanner limits a range of mirror rotation angles and includes posts extending from an adjustable base to define a range of angles for rotation of the mirror and cushioning carried by the posts for softening an impact of the mirror when making contact with the posts. A band of rubber-like material is placed around the posts to provide the cushioning. Operation of the scanner is such that an adjustable mirror stop is provided which does not stop rotation of the rotor itself, but stops rotation of the mirror.

18 Claims, 6 Drawing Sheets

FIG. 6

MIRROR SCANNING CONTROL SYSTEM AND METHOD

CROSS-REFERENCE TO RELATED APPLICATION

This application claims the benefit of U.S. Provisional Patent Application Ser. No. 61/760,430 filed Feb. 4, 2013, the disclosure of which is hereby incorporated by reference in its entirety and commonly owned.

FIELD OF THE INVENTION

The present invention generally relates to optical scanning and mirrors used in oscillating mechanical laser scanners, and more particularly to mechanical scanners such as galvanometric scanners and means for limiting a range of mirror motion.

BACKGROUND

Galvanometer-based optical scanners are specialized motors that typically have a mirror attached to an end of a shaft. Typically, galvanometer-based optical scanners must limit the range of rotation angles of a rotor. At some specific angle, the torque produced by the motor becomes zero. Thus, if the rotor of the motor ever comes to rest in that position and the turning force is zero, the rotor will become immobile or stuck and thus unable to rotate out of the stuck position. Further, a position sensor only responds to a limited range of angles and will not produce a valid signal when operated outside of that range of angles. Yet further, in order to reduce mirror inertia as much as possible, X and Y mirrors used in a scanning system must be placed very close to each other. If operated outside a preselected scanning range, there are some angles at which the X and Y mirrors will collide with each other, resulting in mirror destruction.

There is a need to restrict the rotor to a valid range of angles. As a result, manufacturers of known galvanometers have generally used one of three approaches including drilling a hole through an output shaft or position sensor shaft, and placing a stopping pin into the shaft, wherein the stopping pin engages an external plastic or rubber bumper when the galvanometer is operated outside a desired scanning range. Other known systems have allowed the moving element of the position sensor to collide with an internal rubber bumper, or a mirror mount is allowed to collide with an external metal or plastic bumper.

There are problems with known approaches. In the first case described above where a hole is drilled in the shaft, and where such is also most common, the hole weakens the shaft which lowers shaft stiffness and increases problems related to resonant frequencies. Having to operate with such an undesirable arrangement even if the stop is not used is clearly undesirable. In the second case described above, where the moving element of the position sensor collides with an internal rubber bumper, such collisions may bend the position sensing element, or fatigue the bond between the position sensing element and the position sensing shaft. This affects long term repeatability of the scanner. Yet further in the third case described above, such a technique can only be used when a mirror mount is used, and can not be used when the mirror is directly bonded to a shaft, as is common with low-inertia scanners.

SUMMARY

The teachings of the present invention satisfy the needs addressed above.

As a result, embodiments of the invention may comprise an optical scanner including a shaft rotatably driven within a fixed angle of rotation about an axis of rotation and a mirror carried by the shaft for rotation within a fixed scanning angle. A stop affixed proximate the mirror only contacts the mirror when operating outside the fixed scanning angle.

One embodiment may comprise an apparatus for limiting a range of mirror rotation angles of a galvanometer-based optical scanner. The apparatus may comprise an adjustable base attached to the galvanometer based optical scanner and at least one element protruding from the base. Means for cushioning an impact of the mirror when making contact with the element may be provided, thus softening such impact.

The cushion means may be formed by a band of rubber like material placed around the at last one element. Alternatively, the cushioning means may be formed from blade like protrusions extending from the at least one element.

Embodiments of the invention avoid the need for a stopping pin to prevent the scanner from rotating freely. As a result, the need for a hole drilled through the shaft is eliminated, thus maintaining strength of the shaft. Further, eliminating the stopping pin increases the stiffness and maintains the strength of rotor and position sensor components.

BRIEF DESCRIPTION OF DRAWINGS

Embodiments of the invention are described by way of example with reference to the accompanying drawings in which.

DETAILED DESCRIPTION OF EMBODIMENTS

The present invention will now be described more fully hereinafter with reference to the accompanying drawings, in which embodiments of the invention are shown by way of illustration and example. This invention may, however, be embodied in many forms and should not be construed as limited to the embodiments set forth herein. Rather, these embodiments are provided so that this disclosure will be thorough and complete, and will fully convey the scope of the invention to those skilled in the art.

Figure 1:
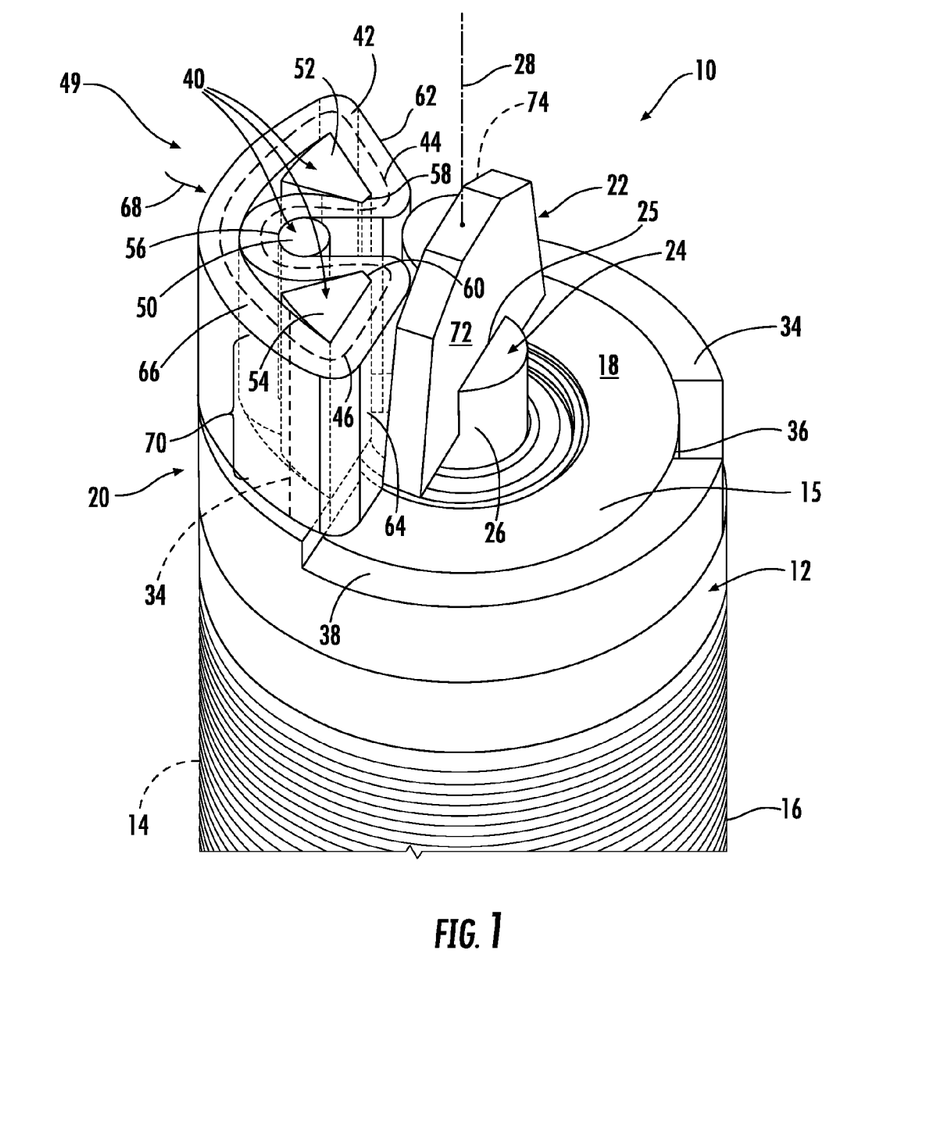
FIG. 1 is a partial top perspective view of one embodiment of a galvanometer styled scanner according to the teachings of the present invention.
Figure 1A:
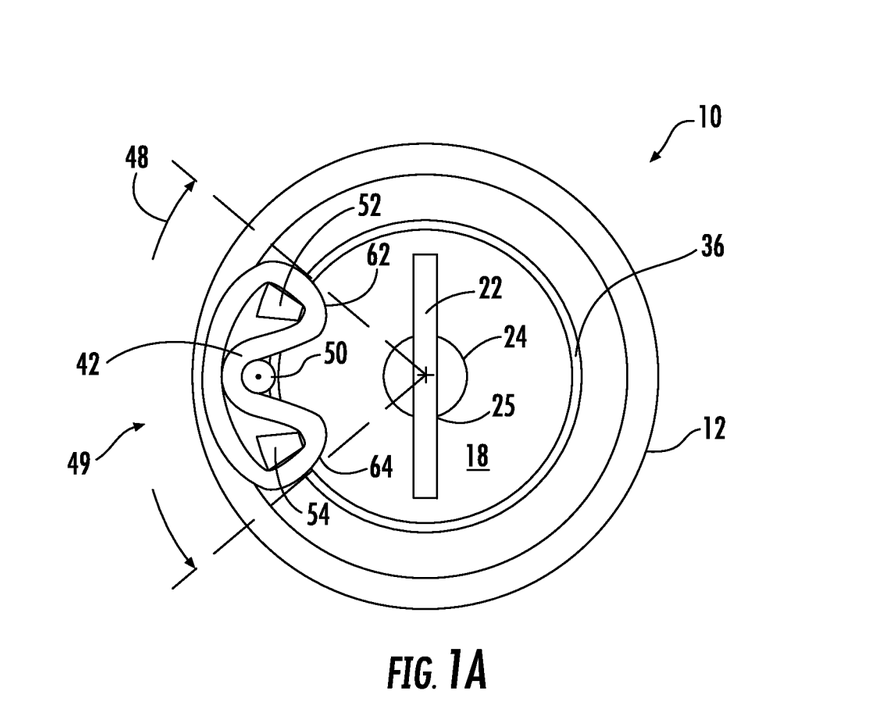
FIG. 1A is a partial diagrammatical illustration of a top view of the scanner of FIG. 1.

With reference initially to FIGS. 1 and 1A by way of example, one embodiment is herein described as an optical scanner 10 having a body 12 within which a motor is carried at a distal end 16 thereof. A generally planar outside surface 18 is herein defined at a proximal end 20 of the body 12 for accommodating a mirror 22. A shaft 24 has its proximal end 26 extending from the body 12 at the outside surface 18 and is rotatably driven by the motor 14 about an axis or rotation 28 within a fixed angle of rotation 30 appropriately preselected for a defined scenario. For the embodiment herein described, the mirror 22 is carried within a slot 25 in the proximal end 26 of the shaft 24.

Figure 1B:
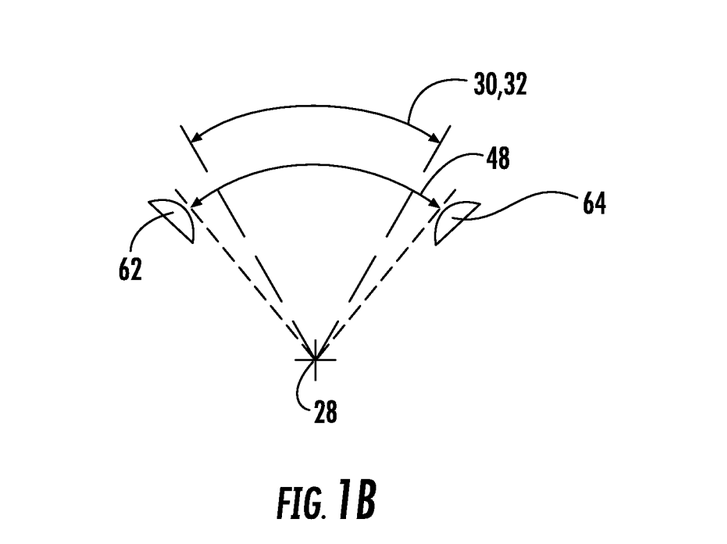
FIG. 1B is a diagrammatical illustration of angles of rotation for a stop and mirror rotation or oscillation.

With continued reference to FIG. 1 and now to FIG. 1B, the mirror 22 is carried directly by the shaft 24 at the shaft proximal end 26 for rotation within a fixed scanning angle 32, herein established by the setting the fixed angle of rotation 30 of the shaft 24. A ring 34 is fixed within a groove 36 extending along a periphery 38 of the outside surface 18 of the body 14 and is located radially outward from the axis of rotation 28 of the shaft 24. While not intended to be limiting, the ring 34 is circular and is frictionally secured into a circular groove 36 extending uniformly about the periphery 38. Such a structure permits ease in adjustment of the ring 34 when needed. A plurality of posts 40 extend upwardly from the ring 34 and generally parallel to the axis of rotation 28 of the shaft 24, and spaced radially outward therefrom.

A flexible band 42 extends about the plurality of posts 40, wherein the flexible band has opposing outside portions 44, 46 fixed within a stop angle of rotation 48, as illustrated with reference again to FIGS. 1A and 1B to provide a stop assembly 49. The stop angle of rotation 48 is greater than the fixed scanning angle of rotation 32 of the mirror 22 to only allow the flexible band 42 to be contacted by the mirror for only rotations of the mirror outside the fixed scanning angle.

With continued reference to FIG. 1, and by way of non-limiting example, the stop assembly 49 comprises the plurality of posts 40 including a first post 50 positioned radially outward from the shaft 24 and a second post 52 and third post 54 in spaced relation to the first post. The flexible band 42 extends around the first post 50 on a radially outside surface 56 thereof and around the second and third posts 52, 54 around radially inside surfaces 58, 60 thereof. As herein illustrated by way of non-limiting example, the flexible band 42 forms a serpentine belt extending around the posts 40. The portions of the flexible band 42 extending around the second and third posts 52, 54 define stops 62, 64 for limiting the rotation of the mirror 22 to within the stop angle of rotation 48 and thus within the permitted rotation outside the fixed scanning angle 32 for the mirror. Adjustment of the ring 34, as above described, permits an adjustment to the stop assembly 49 as desired.

As herein described by way of non-limiting example with continued reference to FIG. 1, the first post 50 has a cylindrical shape having a generally circular cross section, and the second and third posts 52, 54 are generally wedge shaped having a generally triangular cross section. The flexible band 42 is defined as having a length dimension 66, along its serpentine length, sufficient for extending around the posts and frictionally securing the flexible band thereto, a thickness dimension 68 sufficient for cushioning the mirror 22 away from the second and third posts 52, 54 during contact, and a width dimension 70 extending substantially along each post 50, 52, 54. The mirror comprises a reflective side 72 and a back side 74 with the flexible band 42 positioned for contacting the back side during the rotation of the mirror outside the fixed scanning angle 32.

Figure 2:
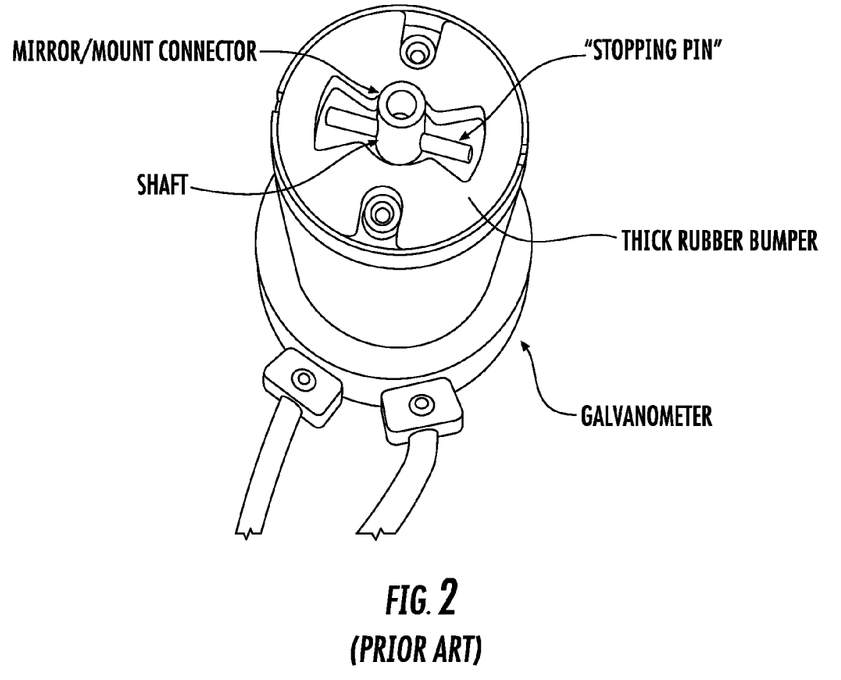
FIGS. 2 and 2A are top perspective and perspective views, respectively, of one known galvanometer and output shaft operable with a stopping pin and rubber bumper.
Figure 2A:
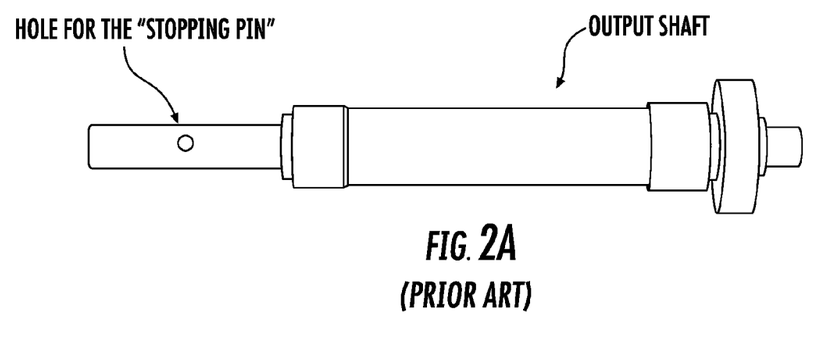

As earlier described, there are problems with known approaches that the teachings of the present invention solve as above described by way of example in one embodiment of the optical scanner 10. For a better appreciation of the problems solved by such an embodiments of the invention, it may be helpful to review such known approaches in greater detail. By way of example and with reference to FIGS. 2 and 2A, a top perspective view of one known galvanometer and related shaft operable with a stopping pin and rubber bumper is illustrated. A hole is drilled in an output shaft of the galvanometer to accommodate the stopping pin. However, the hole makes the rotor undesirably weaker than it would be otherwise and is part of the scanning movement whether needed or not during operation. For such a known embodiment, where a hole is drilled in the shaft, clearly the hole weakens the shaft which lowers shaft stiffness and increases problems related to resonant frequencies.

Figure 3:
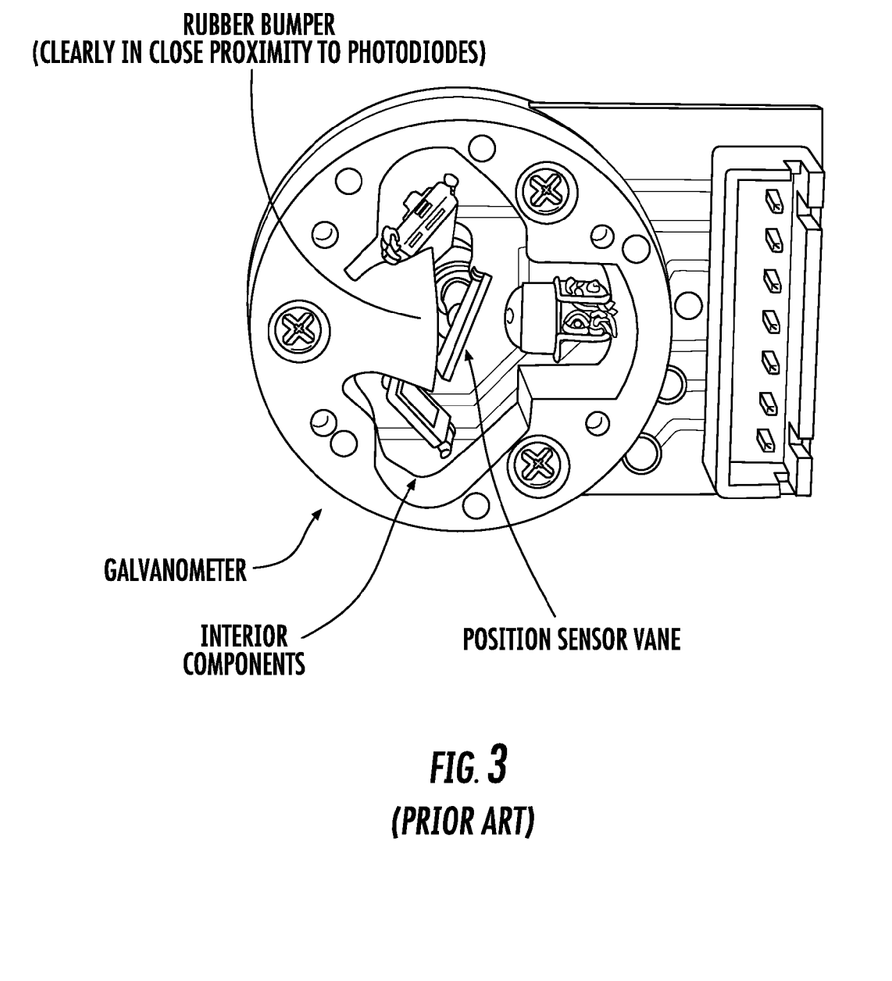
FIG. 3 is a bottom view of a known galvanometer, wherein a moving element of a position sensor, a position sensor vane, collides with an internal rubber bumper.

By way of further example and with reference to FIG. 3, a bottom view of a known galvanometer is illustrated, wherein a moving element of a position sensor, in this example a rotating vane, collides with an internal rubber bumper. In this example, where the moving element of the position sensor collides with an internal rubber bumper, such collisions may bend the position sensing element, or fatigue the bond between the position sensing element and the position sensing shaft. This undesirably affects long term repeatability of the scanner.

Figure 4:
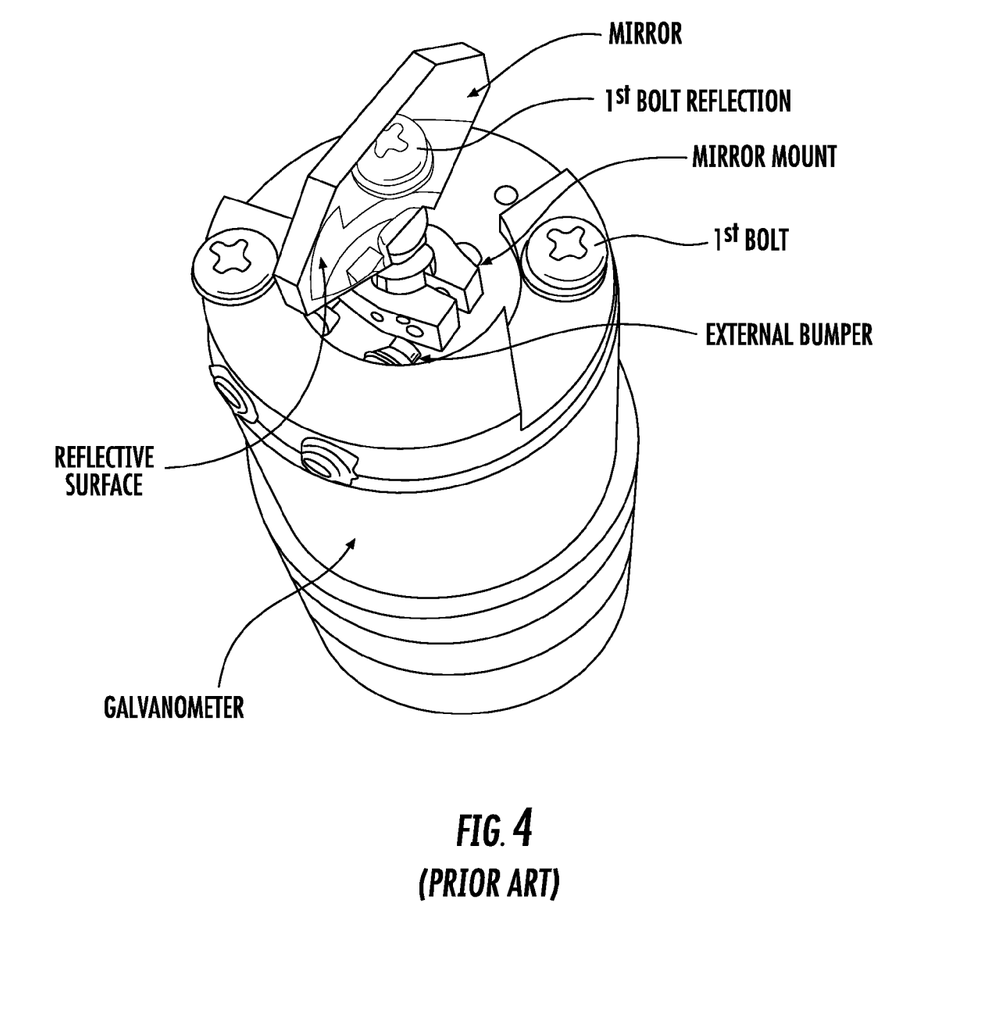
FIG. 4 is a top perspective view of a known galvanometer with adjustable hard plastic bumpers that collide with a mirror mount.

By way of yet further example, and with reference to FIG. 4, a top view of a known galvanometer is illustrated having adjustable hard plastic bumpers that collide with the mirror mount. Such a technique can only be used when a mirror mount is used, and cannot be used when the mirror is directly bonded to a shaft, as is common with low-inertia scanners.

With some review and with reference again to FIG. 1, instead of stopping the rotor or shaft 24 itself from rotating, a bumper in the form of the stops 62, 62 formed by the flexible band 42 will stop the mirror 22 itself if its rotation exceeds a preselected range. It is desirable that such a bumper as herein described as the flexible band by way of example, attaches directly to an outside portion of the scanner 10. As will be understood and appreciated by those of skill in the art, it is desirable to have both the fixed scanning angle 32 and the stop angle of rotation limits adjustable. For the embodiment herein described with reference to FIG. 1, the posts 40 and the ring 34 are made of brass. The flexible band 42 is made of clear, surgical-grade silicone. As described, the movable mirror stop 62, 64 does not stop the rotor or shaft 24 itself, but stops rotation of the mirror 22.

With continued reference to FIG. 1, the ring-shaped brass ring 34 fits within or around the groove 36 in the body 12 of the scanner 10. Brass posts 40 extend upwardly from the brass ring 34 and galvanometer shaft 24. The flexible band 42 made of soft, rubber-like material is wrapped around the posts 40 in such a way that it will not interfer with shaft rotation or with the mirror 22 as it rotates within a desired and preselected range of angles. However and as above described, if the mirror 22 exceeds the preselected range of angles, the mirror will come in contact with the soft band 42, wherein the soft band effectively forms a cushion which will soften any impact on the mirror.

Also, although the mirror stop illustrated with continued reference to FIG. 1 includes the ring 34 attached about a circumference of the groove 36 in the galvanometer body 12, allowing for easy adjustment of the mirror stop apparatus relative to the galvanometer body, it is understood that the mirror stop embodiment may also be implemented in different ways without departing from the teachings of the present invention. By way of example, the ring 34 may be screwed into a top surface of the galvanometer body 12, or a structure (not illustrated) into which the galvanometer may be mounted. Also, although the embodiment herein described by way of example is made from brass and includes a soft material wrapped around the brass posts, it is not intended to be a limitation.

By way of further example, silicone works well for the flexible band material. It does not degrade over time and it is easy to place over the posts. However, other rubber or rubber-like materials may also be used.

The embodiment, herein described by way of example, includes the mirror stop that is particularly well suited for galvanometers on whose rotors and shafts the mirror is directly mounted. In other words, such a system is desirable for those galvanometers which do not use a separate mirror mount. Eliminating a separate mirror mount, as described with reference to the known scanner of FIG. 4, desirably eliminates inertia and increases rotor/mirror stiffness, ultimately improving performance. Because of this, any device which imposes a limitation on the range of accessible mirror angles will also impose that same limitation on rotor rotation as well.

With reference again to FIG. 1, the embodiment illustrated will restrict mirror motion to approximately 45 degrees mechanical peak-to-peak. However, although this degree of limitation is common, it is not necessary and is not intended to be a limitation. Generally, the mirror stop apparatus herein described for the scanner 10 desirably prevents two phenomena including preventing the rotor or shaft 24 from rotating to an angle where the motor has no torque, and preventing the mirror 22 from rotating to an angle where it will collide with another mirror 76 operable within a scanning system 78, as illustrated with reference to FIG. 5, wherein the mirrors 22, 76 are closely spaced 80 during their rotation for reflecting a laser beam 82 and reflecting the beam toward a target 84.

For this reason, a range may be 90 degrees or more. Thus, instead of three posts 40 as herein illustrated by way of example with reference to FIG. 1, a single post 86 and tubular-shaped band 88 placed on the single post may be employed to prevent the mirror 22 from colliding with another cooperating mirror while also preventing rotation into an angle where the motor has no torque, as illustrated with reference to FIG. 6.

Figure 5:
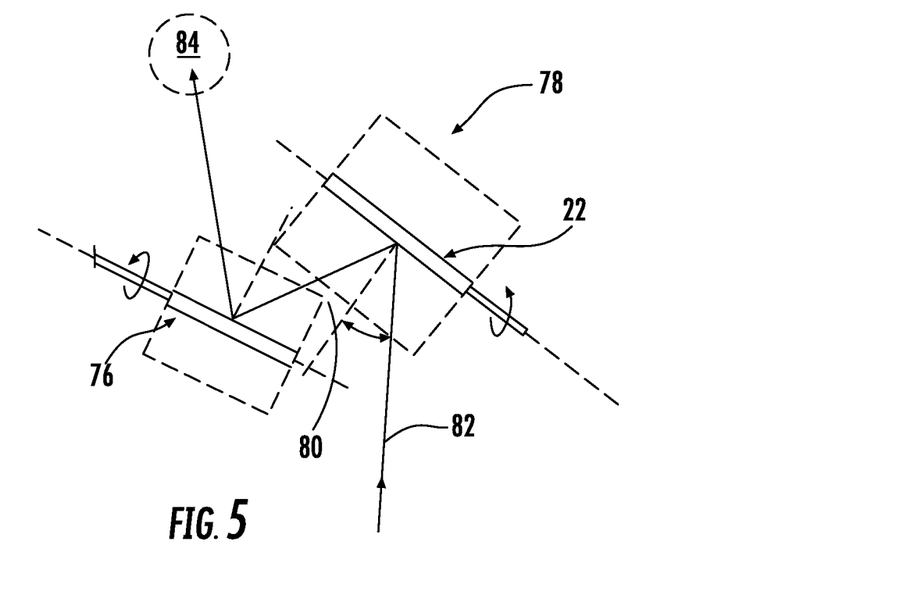
FIG. 5 is a diagrammatical illustration of a scanning system having first and second scanning mirror operating in close proximity.
Figure 6:
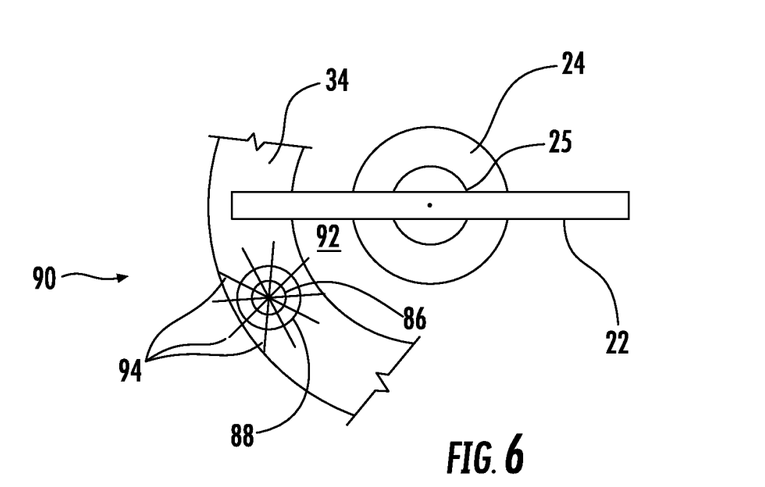
FIG. 6 is a diagrammatical illustration of an alternate embodiment of the invention.

With continued reference to FIG. 6, a mirror stop assembly 90 may be made from the single post 86 of a piece of semi-soft plastic material, such as the thermoplastic material Delrin®, having the post 86 extend from a base 92 and may have additional thin, blade-like protrusions 94, as illustrated with reference to FIG. 5. With the blade-like protrusions 94, when the mirror 22 comes in contact with them, they will bend, thus providing a similar cushion effect that the silicone band material provides.

Although the invention has been described relative to various selected embodiments herein presented by way of example, there are numerous variations and modifications that will be readily apparent to those skilled in the art in light of the above teachings. It is therefore to be understood that, within the scope of the claims supported by this specification, the invention may be practiced other than as specifically described.

That which is claimed is:

1. An optical scanner comprising:
    a shaft rotatably driven within a fixed angle of rotation about an axis of rotation;
    a mirror carried by the shaft for rotation within a fixed scanning angle; and
    a stop affixed proximate the mirror for only contacting the mirror operating outside the fixed scanning angle.
2. The optical scanner according to claim 1, comprising a motor operable for driving the shaft about an axis of rotation, wherein the stop prevents rotation of the shaft to an angle wherein the motor has no torque.
3. The optical scanner according to claim 2, further comprising a second mirror being scanned about a second axis of rotation, wherein the stop limits rotation to avoid collision of the mirrors.
4. The optical scanner according to claim 1, wherein the stop comprises a post extending generally parallel to and in spaced relation to the shaft and cushioning means carried by the post for contacting the mirror operating outside the fixed scanning angle.
5. The optical scanner according to claim 4, wherein the cushioning means comprises a flexible band.
6. The optical scanner according to claim 4, wherein the cushioning means comprises protrusions extending from the post.
7. The optical scanner according to claim 1, wherein the stop comprises:
    a plurality of posts extending parallel to the axis of rotation of the shaft and radially outward therefrom; and
    a flexible band extending about the plurality of posts having opposing outside portions fixed within a stop angle of rotation, wherein the stop angle of rotation is greater than the fixed scanning angle of rotation of the mirror, and wherein the flexible band is contacted by the mirror for only a rotation of the mirror outside the fixed scanning angle.
8. The optical scanner according to claim 7, further comprising:
    a body having a motor carried therein and an outside surface at a proximal end thereof; and
    a ring fixed to the outside surface of the body and radially outward the axis of rotation of the shaft, wherein the plurality of posts extends from the ring.
9. The optical scanner according to claim 8, wherein the outside surface of the body comprises a generally planar surface having a groove formed about a periphery thereof, and wherein the ring is frictionally fixed within the groove for adjustment of the stop.
10. The optical scanner according to claim 1, wherein the shaft includes a slot extending radially therein, and wherein the mirror is carried within the slot.
11. The optical scanner according to claim 1, wherein the fixed scanning angle of the mirror is exceeded as a result of at least one of a failure in a servo motor operable with the scanner, a power failure, and an incorrect adjustment to the scanning angle.
12. The optical scanner according to claim 1, wherein the stop comprises
    a single stop.
13. The optical scanner according to claim 1, comprising a motor operable for driving the shaft about the axis of rotation, wherein the stop prevents rotation of the shaft to an angle wherein the motor has no torque.
14. The optical scanner according to claim 1, wherein the stop comprises a single post extending generally parallel to and in spaced relation to the shaft and cushioning means carried by the single post for contacting the mirror operating outside the fixed scanning angle.
15. The optical scanner according to claim 14, wherein the cushioning means comprises a protrusion extending from the single post.
16. The optical scanner according to claim 15, wherein the protrusion comprises a plurality of blade-like protrusions extending generally radially outward from the single post.
17. The optical scanner according to claim 1, further comprising:

a body having a motor carried therein and an outside surface at a proximal end thereof; and a ring fixed to the outside surface of the body and radially outward the axis of rotation of the shaft, wherein the stop is attached to and extends from the ring.

18. The optical scanner according to claim 1, wherein the shaft includes a slot therein, and wherein the mirror is carried within the slot.

\* \* \* \* \*